(12) United States Patent
Germaine et al.

(10) Patent No.: US 11,407,182 B1
(45) Date of Patent: Aug. 9, 2022

(54) DEPTH CONTROL OF SEAL LINE PENETRATION FOR ROTARY ULTRASONIC HORN/ANVIL WELDING WITHOUT MECHANICAL STOP

(71) Applicant: Dukane IAS, LLC, St. Charles, IL (US)

(72) Inventors: Andrew Germaine, East Yorkshire (GB); Patrick Sean McNichols, Hortonville, WI (US); Petr Vasko, Velke Prilepy (CZ); Robert Edward Aldaz, St. Charles, IL (US)

(73) Assignee: Dukane IAS, LLC, St. Charles, IL (US)

( * ) Notice: Subject to any disclaimer, the term of this patent is extended or adjusted under 35 U.S.C. 154(b) by 0 days.

(21) Appl. No.: 17/399,429

(22) Filed: Aug. 11, 2021

(51) Int. Cl.
*B32B 41/00* (2006.01)
*B29C 65/08* (2006.01)
*B29C 65/00* (2006.01)

(52) U.S. Cl.
CPC ........ *B29C 65/083* (2013.01); *B29C 66/1122* (2013.01); *B29C 66/41* (2013.01); *B29C 66/73921* (2013.01)

(58) Field of Classification Search
CPC ... B29C 65/083; B29C 66/1122; B29C 66/41; B29C 66/73921
USPC .................... 156/60, 64, 350, 351, 378, 379
See application file for complete search history.

(56) References Cited

U.S. PATENT DOCUMENTS

| | | | |
|---|---|---|---|
| 10,889,066 B2 | 1/2021 | Begrow | |
| 2018/0093444 A1* | 4/2018 | Begrow | B29C 66/8161 |

\* cited by examiner

*Primary Examiner* — Michael N Orlando
*Assistant Examiner* — Joshel Rivera
(74) *Attorney, Agent, or Firm* — Nixon Peabody LLP

(57) ABSTRACT

An apparatus for joining a first film portion and a second film portion together along a seal line. The apparatus includes a horn and an anvil. The anvil is positionable in close proximity to the horn. Either the horn or the anvil has a face with a width dimension and a circumference and is rotatable about a rotation axis. The face has a raised profile, and a height of the raised profile has a dimension corresponding to 50% to 150% of a thickness of the first film portion or the second film portion. The face is positioned such that the raised profile extends along the circumference such that continuous running contact is provided between the raised profile and the other of the one of the horn or the anvil when rotated about the rotation axis, to form the seal line without any external structure to control a distance between the horn and the anvil.

11 Claims, 8 Drawing Sheets

DEPTH CONTROL OF SEAL LINE PENETRATION FOR ROTARY ULTRASONIC HORN/ANVIL WELDING WITHOUT MECHANICAL STOP

FIELD OF THE INVENTION

The present disclosure relates generally to ultrasonic welding systems, and, more particularly, to depth control of seal line penetration for a rotary ultrasonic horn or anvil welding without a mechanical stop.

BACKGROUND OF THE INVENTION

When bonding thin (thickness less than 150 μm) films, it can be difficult to achieve consistent penetration with an air-loaded system. This is particularly true of monolayer and mono-material films. In some ultrasonic welding applications, it is advantageous to use a horn and anvil that are disc-shaped, which are referred to as rotary horns or rotary anvils. When the application calls for a seal or joint to be formed between two substrates or layers to be joined of an end product (e.g., a pouch or container), some conventional rotary ultrasonic techniques employ a mechanical stop to control the depth of the joint or seal by stopping the advancing ultrasonic horn, but mechanical stops have very severe limitations for thin film processing. A mechanical stop requires near perfect and total concentricity of the rotating elements (rotary horn and rotary anvil), especially for thin film applications around 0.002 inches (50 μm) in thickness, and is subject to mechanical wear and tear over time, which adversely impacts consistent depth control of the joint or seal. Mechanical stops also require the designer to eliminate the effects of thermal expansion and contraction, and the operator would require a high level of accumulated skill to be able to make micro adjustments to such a mechanical stop to accommodate different film thicknesses. Mechanical stops are composed of multiple components, such as bearings, shaft, and other components whose manufacturing tolerances can induce small but significant elements of rotational runout. If such runout were to occur, and due to the very small gap dimension required between the rotating elements, bond consistency from end product to end product would be lost.

Other conventional rotary applications employing ultrasonic energy have a pattern of ridges formed on the surface of the rotary horn and/or rotary anvil, such as disclosed in U.S. Pat. No. 10,889,066 owned by the same assignee of the present disclosure, which is particularly well suited for bonding nonwoven fabrics, by entrapping elastic strands in a permanent state of tension. These are not particularly well suited for melting plastics together to create a hermetic or airtight seal between the two plastic parts. Moreover, the ridge pattern tends to have a height far greater than a thickness of the fabric being bonded together by the ultrasonic energy. Patterned profiles also do not create hermetic seals, which are required in some applications, e.g., pouches or containers that will be filled with a liquid.

Still further conventional rotary ultrasonic welding applications incorporate a raised profile on the horn or anvil, but like patterned profiles, the overall height of these raised profiles are greater (typically many orders of magnitude greater) than a thickness of the parts being joined together, and thus cannot serve to control the depth of the seal line and are not well suited for sealing thin films together. Tall raised profiles like these lead to weakening of the bond or seal due to the high force/pressure applied, and are thus not desirable for use in sealing (plastic) films.

FIG. 1A is a cross-section of a cutaway portion of a prior art anvil 100 having a raised, patterned profile 102. The patterned profile 102 has a height, H1, that is orders of magnitude greater than a thickness of a layer of a part sandwiched between the anvil 100 and a conventional horn that receives ultrasonic energy. Due to the magnitude of height, H1, a high amount of force or pressure is applied to the layers sandwiched between the horn and anvil 100, which, particularly in the case where the layers are films, such as plastic films, can lead to an undesirable weakening (e.g., excessive thinning) of the seal line or bond formed at the interface between the patterned profile 102 and the horn when the mechanical stop insufficiently limits the weld force and distance due to lack of concentricity, thermal expansion, or improper operator adjustment.

FIG. 1B is a cross-section of a cutaway portion of another prior art anvil 110, also having a raised profile 112, but the raised profile 112 has a smooth surface as opposed to a patterned surface such as shown in FIG. 1A. Like the anvil 100, the raised profile 112 of the anvil 110 shown in FIG. 1B has a height, H2 of 0.063 inches, much greater than a thickness (typically more than double) of a layer of a part sandwiched between the anvil 112 and a conventional horn. Like the conventional profile shown in FIG. 1A, the conventional profile of FIG. 1B will operate to weakening the bond or seal formed between film layers. The raised profile 112 shown in FIG. 1B forms a continuous seal, but it can adversely thin the material being welded too much, thus weakening it and the package being sealed when the mechanical stop insufficiently limits the weld force and distance due to lack of concentricity, thermal expansion, or improper operator adjustment.

A need exists, therefore, for a rotary ultrasonic welding technique that does not use a mechanical stop and can accurately and repeatedly join two thin parts (e.g., portions of film) together and accommodate parts of varying thickness. Aspects of the present disclosure are directed to fulfilling this and other needs.

SUMMARY OF THE INVENTION

Key features of the present invention are the height of the profile and the absence of any mechanical stop device to control depth of the seal using ultrasonic energy applied by a rotary horn and anvil. The height of the profile is extremely small, such as between 50% and 150% or 100% of a thickness of the film or part being joined. The extremely low height of the profile on the horn or anvil (it can be present on either, or both), provides a "dynamic mechanical stop" effect without any actual external mechanical stop, by squeezing the two layers of film with enough force or pressure to achieve the mechanical support, but not so hard as to melt the plastic in the film layers. The combination of the height of the profile and the absence of any mechanical stop structure to control depth of seal penetration is a key difference over the prior art.

The profile can extend continuously and circumscribe an entire circumferential outer surface of a rotary horn or rotary anvil. A continuous, circumferential profile maintains a constant and continuous force/pressure on the film while sealing while the profile's height is no greater than a thickness of the film.

The profile heights depend on a thickness of the film being sealed, but in some embodiments, the height of the profile can begin as low as 0.002" (inches) high and then step up very tiny, 0.0005" increments, which demonstrates the high precision needed from an alternative design employing a conventional mechanical stop as opposed to the depth control anvil design of the present disclosure.

According to an aspect of the present disclosure, an apparatus for joining a first film portion and a second film portion together along a seal line using ultrasonic energy is disclosed. The apparatus includes: a horn configured to receive ultrasonic energy; and an anvil positionable in close proximity to the horn that is advanced toward the anvil, wherein at least one of the horn or the anvil has a face with a width dimension and a circumference and is rotatable about a rotation axis. The face has a raised profile, a height of the raised profile has a dimension corresponding to 50% to 150% of a thickness of the first film portion or the second film portion. The face is positioned such that the raised profile extends along the circumference. Continuous running contact is provided between the raised profile and the other of the one of the horn or the anvil when rotated about the rotation axis, to form the seal line without any external structure to control a distance between the horn and the anvil. The thickness of the first film portion and the second film portion can be between 10 μm and 150 μm.

The height dimension of the raised profile can correspond to 100% of the thickness of the first film portion or the second film portion. The height dimension of the raised profile can correspond to between 50% and 125% of the thickness of the first film portion of the second film portion. The first film portion and/or the second film portion can be composed of a plastic. The first film portion or the second film portion can be a multilayer film, a recyclable film, a biodegradable film, a compostable film, a monolayer film, a paper-based film, or a mono-material film.

The raised profile can further include a scoring element configured to score or cut along the seal line as the anvil is rotated about the rotation axis. The face can have a second raised profile having a height corresponding to 50% to 150% of the thickness of the first film portion or the second film portion. The second raised profile can extend along the circumference, and continuous running contact can be provided between the second raised profile and the other of the one of the horn or the anvil when rotated about the rotation axis.

The height dimension of the second raised profile can correspond to 100% of the thickness of the first film portion or the second film portion. The raised profile can be part of the anvil, and further in combination with a second anvil can have a second raised profile having a height dimension exceeding the height dimension of the raised profile by 0.0005 inches.

A product is disclosed which includes the first film portion and the second film portion and the seal line formed by any apparatus disclosed herein.

DETAILED DESCRIPTION

Figure 1A:
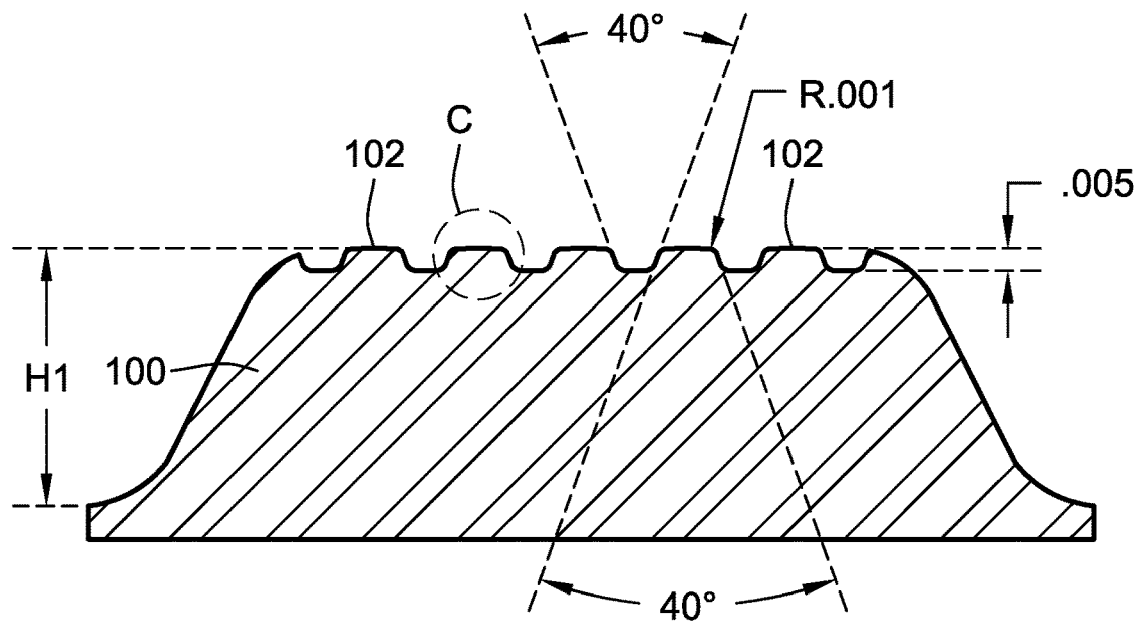
FIG. 1A is a cross-section of a cutaway portion of a prior art anvil having a raised, patterned profile.
Figure 1B:
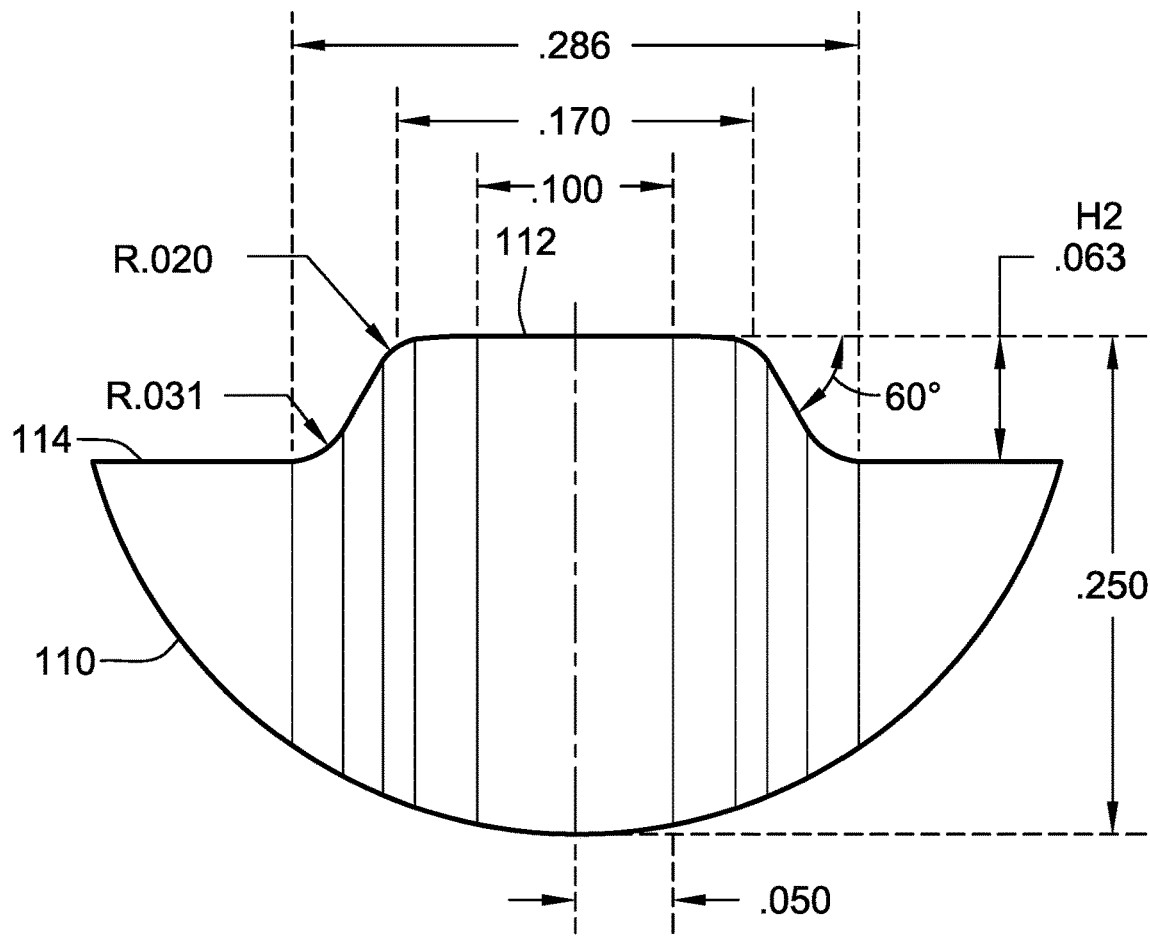
FIG. 1B is cross-section of a cutaway portion of another prior art anvil 110, having a smooth, raised profile 112.
Figure 2:
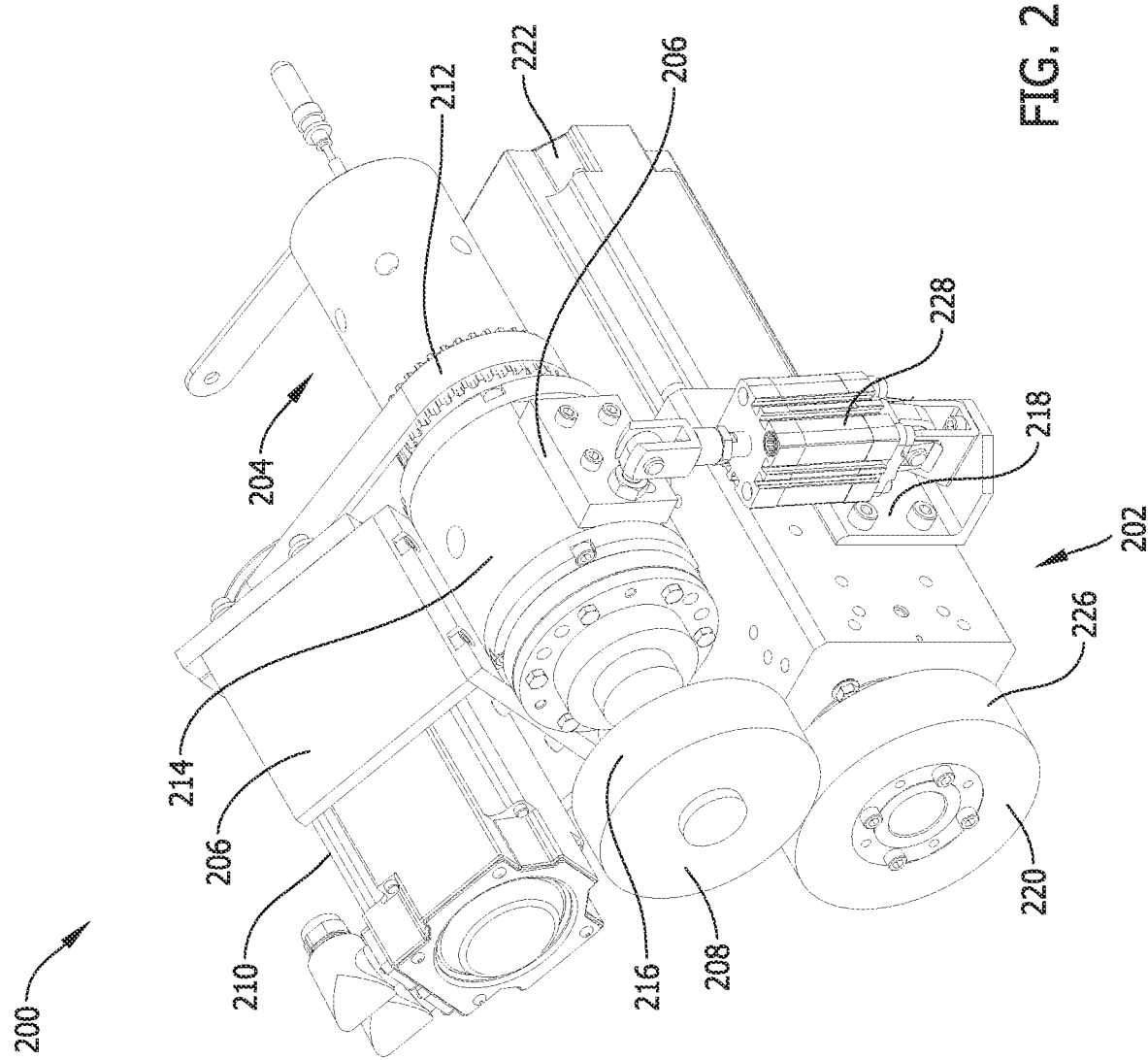
FIG. 2 is a perspective illustration of a rotary ultrasonic bonding apparatus suitable for use with the raised profile on either the anvil or horn, creating a dynamic stop effect.

FIG. 2 is a general illustration of a rotary ultrasonic bonding apparatus 200, the general operation and components of which will be very familiar to a person of ordinary skill in the art of ultrasonic welding, and in particular, rotary ultrasonic welding technology. The apparatus 200 has an anvil module 202 and a horn module 204, which cooperate to perform a bonding or sealing operation of multiple parts, e.g., two or more layers of film, as set forth in more detail below.

The horn module 204 includes a frame 206 on which are mounted a disc-like rotary horn 208, a motor 210 for driving rotation of the horn 208 via a suitable drive train 212, and a housing 214 that contains at least part of a vibration control unit (not shown) that causes the horn 208 to vibrate. The horn 208 has an exposed outer face 216 with a substantially continuous contour (i.e., the horn face 216 has a contour that is substantially smooth (or uninterrupted) across its entire surface area). In other embodiments, the horn face 216 may have any suitable contour that facilitates enabling the horn 208 to function as described herein.

In some embodiments, the vibration control unit (while not illustrated) includes a conventional booster (e.g., a drive booster and an integral booster) mechanically connected to a converter, which is electrically connectable to a generator. The converter is capable of converting high frequency electrical energy supplied by the generator into mechanical energy (or vibration) that is selectively transmitted to the horn 208 across the booster(s). The booster(s) are capable of modifying (i.e., increasing or decreasing) the vibration transmitted to the horn 208 from the converter, such that the horn 208 (particularly, the face 216 of the horn 208) vibrates while it rotates during a bonding operation, as set forth in more detail below. It is contemplated that the horn module 204 may have any suitable operational components arranged in any suitable manner that facilitates enabling the horn 208 to function as described herein. The details not shown would be readily apparent to any person skilled in the art familiar with rotary ultrasonic bonding systems.

In the illustrated embodiments, the anvil module 202 includes a frame 218 on which are mounted a disc-like rotary anvil 220 and a motor 222 for driving rotation of the anvil 220 via a suitable drive train. The anvil 220 has an exposed outer face 226 with a substantially continuous contour (i.e., the anvil face 226 has a contour that is substantially smooth or uninterrupted across its entire surface area). The anvil module 202 is positioned relative to the horn module 204 such that the anvil face 226 is rotatable about a rotation axis, R (seen in FIG. 4), in close proximity to the horn face 216, and vice versa, to facilitate ultrasonically bonding the parts as they are held in tension across apparatus 200, as set forth in more detail below. As used herein, the term "close proximity" refers to when the anvil face 226 is either in contact with, or is minimally spaced apart from, the horn face 216 when the horn 208 is not ultrasonically vibrating.

In some embodiments, the apparatus 200 may be configured such that at least one of the anvil module 202 and the horn module 204 is displaceable relative to the other via a suitable displacement mechanism operable either: (A) when the system 100 is offline and the horn 208 is at rest (i.e., when the horn 208 is not rotating or vibrating); or (B) when the system 100 is online and the horn 208 is active (i.e., when the horn 208 is rotating and vibrating).

With particular reference to the embodiment illustrated in FIG. 2, the apparatus 200 may be configured as a continuous-nip apparatus in which the horn module 204 is to be: (A) fixed in position relative to the anvil module 202 when the system 100 is online and the horn 208 is active; and (B) displaceable relative to the anvil module 202 when the system 100 is offline and the horn 208 is at rest. Such displacement is facilitated by a selectively actuatable pneumatic cylinder 228 (or other suitable linear actuator) that connects the frames 206, 218 to one another. In this manner, the spacing between the horn face 216 and the anvil face 226 is adjustable primarily for servicing the apparatus 200 when the system 100 is offline.

Figure 3:
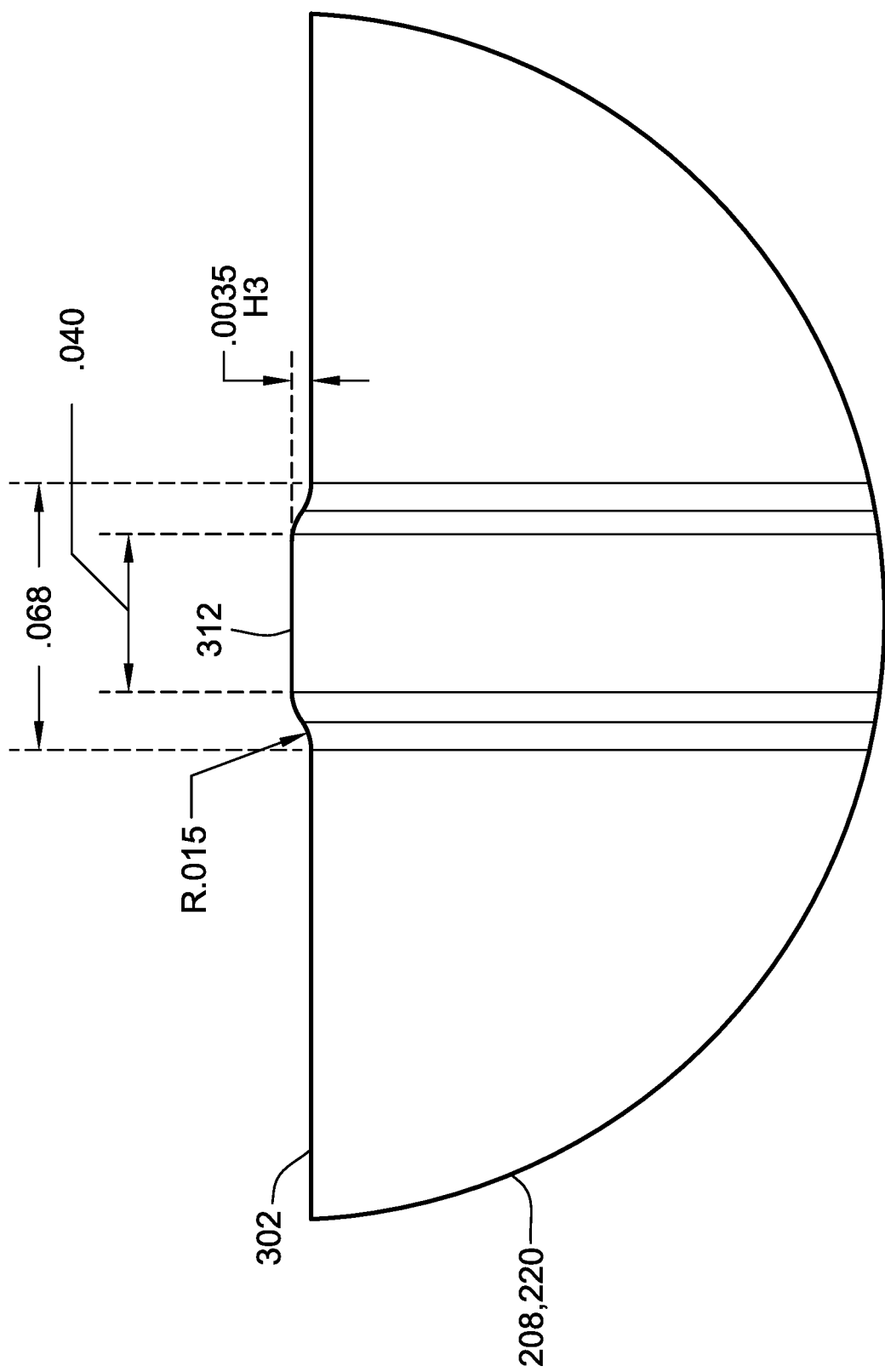
FIG. 3 is an enlarged, cross-sectional view of a portion of a horn or anvil having a raised profile according to an aspect of the present disclosure.
Figure 4:
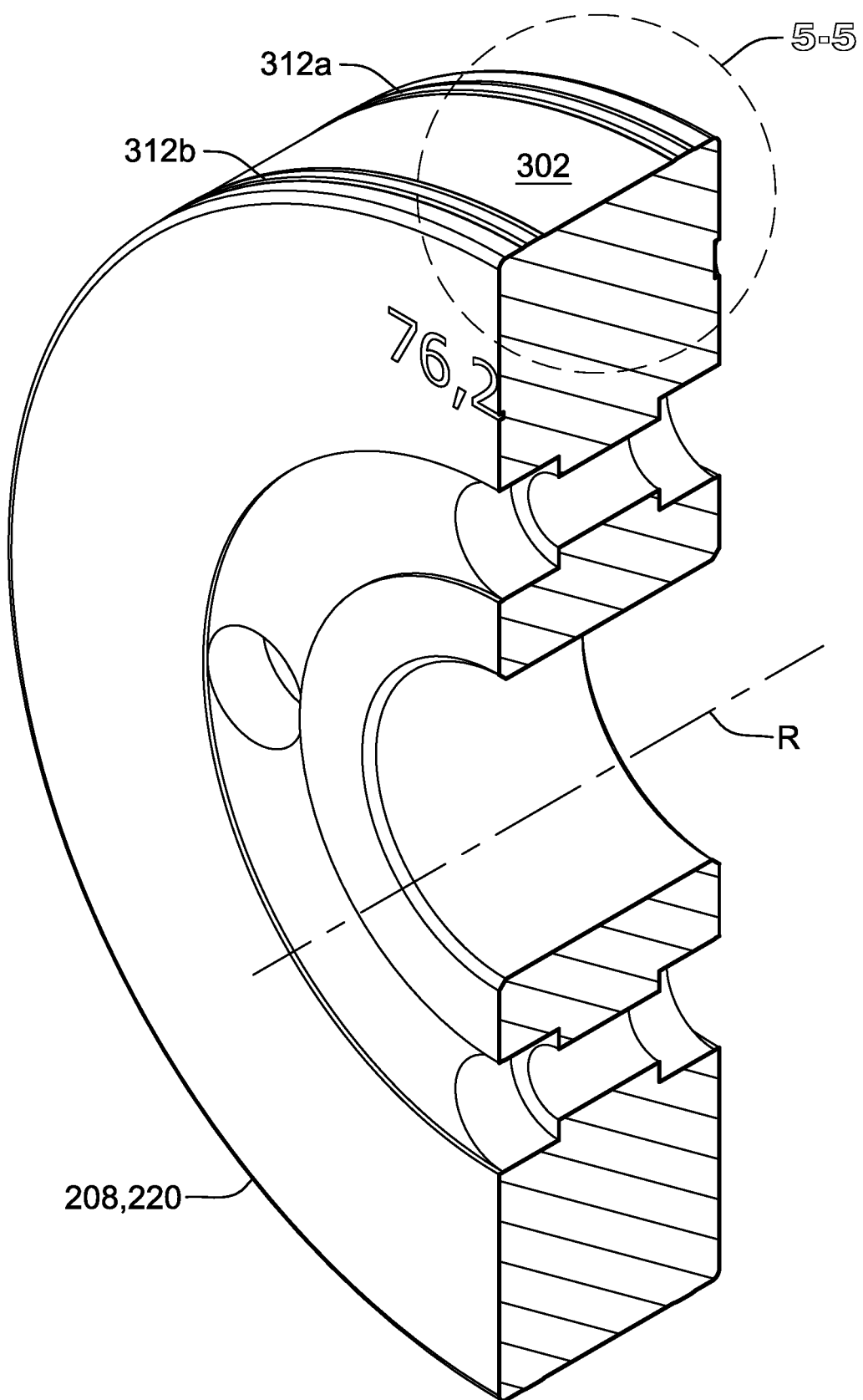
FIG. 4 is an isometric, cutaway view of a horn or anvil according to another aspect of the present disclosure having two raised profiles thereon, creating a dynamic stop effect thereby.

FIG. 3 illustrates a cross section of a part of the horn or anvil 208, 220 having an outer face 302 having a substantially continuous contour (i.e., the outer face 302 has a contour that is substantially smooth or uninterrupted across its entire surface area), and a raised profile 312 having a height, H3, that is between 50% and 150% (e.g., 100%) of a thickness of a part to be joined between the horn and anvil 208, 220. It should be emphasized that the raised profile 312 can be present on the horn 208 or the anvil 220 or both, and the principles discussed herein apply equally to both the horn 208 and the anvil 220. In most applications, the raised profile 312 is present on the anvil 220. There can be more than one raised profile 312, e.g., such as best seen in FIG. 4. Multiple raised profiles like the raised profile 312 can be present on the horn 208, on the anvil 220, or distributed among the horn 208 and the anvil 220 (e.g., a raised profile can be present on the horn 208, and a raised profile can be present on the anvil 220) for joining one pair of parts together or multiple pairs of parts together. The raised profile 312 can be referred to herein as a "depth control" profile, because it serves to control the depth of weld penetration into parts to be joined together by sealing or bonding.

The raised profile 312 shown in FIG. 3 has a substantially flat and continuous raised surface having a width of 0.040 inches, and which is transitioned on both sides by a curved surface having a radius, R=0.015 inches. The width of the raised profile 312 is also much narrower compared to prior art non-patterned profiles, and e.g., spans less than 10% or less than 7% or less than 5% of the entire width of the horn 208 or the anvil 220. The radius dimension is exemplary, but plays a role in imparting a dynamic stop functionality to the rotary system without the need for a mechanical stop found in prior art rotary ultrasonic welding systems. The radius dimension is also a function of the height, H3, of the raised profile 312, but the height, H3, is constrained not to exceed a thickness of a part, such as a film, to be joined between the horn 208 and the anvil 220 by application of ultrasonic energy to the horn 208 as the horn 208 and anvil 220 rotate relative to one another about a rotation axis, R (seen in FIG. 4). In this example, the raised profile 312 has a height, H3, e.g., that is about 0.0035 inches (within a typical tolerance). However, the height, H3, can be as low as 0.002 inches to accommodate films of that thickness.

The horn 208 or the anvil 220 can be readily swapped out for another horn 208 or anvil 220 having a differently sized (e.g., height and/or width) raised profile. The height, H3, of each raised profile can be machined to differ by increments of only 0.0005 inches from profile to profile. For example, if the smallest height profile has a height of 0.0020 inches, the next profile can have a height of 0.0025 inches, followed by 0.0030 inches, and so forth. Using the example shown in FIG. 3, the raised profile 312 on one anvil 220 can have a height of approximately 0.003 inches, and another anvil can have a raised profile with a height of 0.0035 inches, followed by 0.0040 inches, and so forth. Depending on the thickness of the parts (e.g., films) being joined together, the anvil 220 or the horn 208 can be easily swapped out to match the raised profile's height with the part's thickness. It should be emphasized that the dimensions or tolerances provided herein are exemplary only and are used to illustrate the relative height of the profile relative to the thickness of the part layer(s) being welded or joined together.

Figure 5:
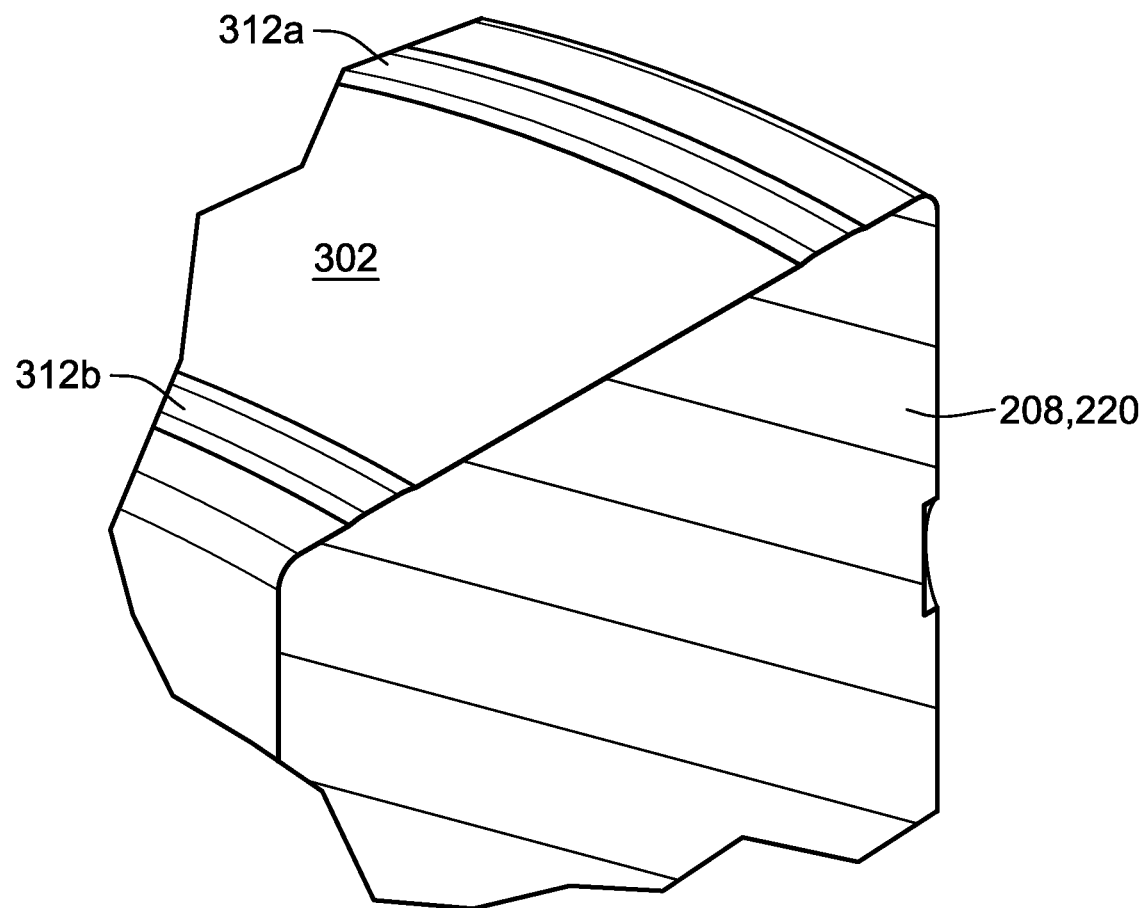
FIG. 5 is an isometric, cutaway view of the horn or anvil having two raised profiles shown in FIG. 4.
Figure 6:
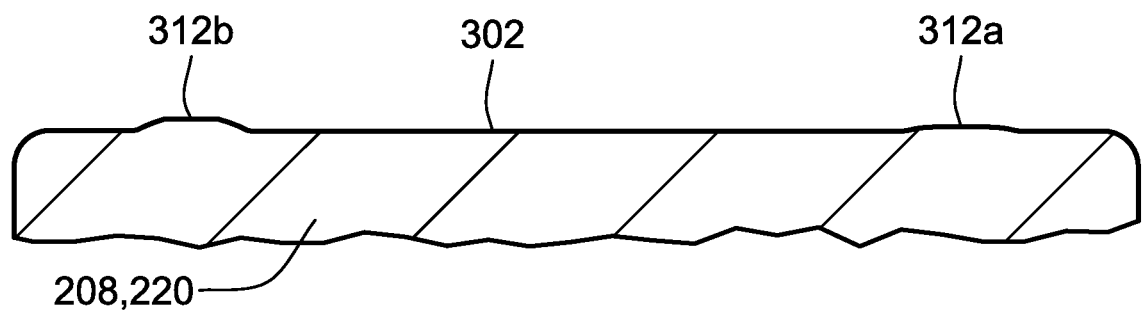
FIG. 6 is a cross-sectional view of a portion of the horn or anvil shown in FIG. 5.

The raised profile 312 can encircle the entire circumference of the horn 208 or the anvil 220, such as shown in the partial cutaway perspective view shown in FIG. 4 and in more detail in FIGS. 5 and 6. Due to the extremely narrow height of the raised profiles 312a, 312b, FIGS. 5 and 6 illustrate enlarged views of the raised profiles 312a, 312b (two are shown in FIG. 5). Energy for adequate bonding to occur at the profile 312 is provided. It should be noted that the height of the raised profiles 312a, 312b can be different. This can be useful, e.g., when the raised profiles 312a, 312b are on the horn 208, and the anvil 220 has a narrower width compared to the horn 208. This allows the operator or end user to use the same horn 208 for welding different part thicknesses by simply flipping the horn 208 around so that the appropriate raised profile (312a or 312b) is in contact with the anvil 220. For example, if the raised profile 312a has height X, and the raised profile 312b has height Y>X, when the thicker part is needed to be welded, the horn 208 can be flipped so that the raised profile 312b contacts the anvil 208; whereas when a thinner part is needed to be welded, the horn 208 can be flipped so that the raised profile 312a contacts the anvil 208 instead. It should be emphasized that the respective widths of the horn 208 and the anvil 220 can be the same or different (e.g., the anvil 208 can be thinner or narrower compared to the horn 220 when the raised profiles 312a, 312b are present on the horn 220).

Figure 7:
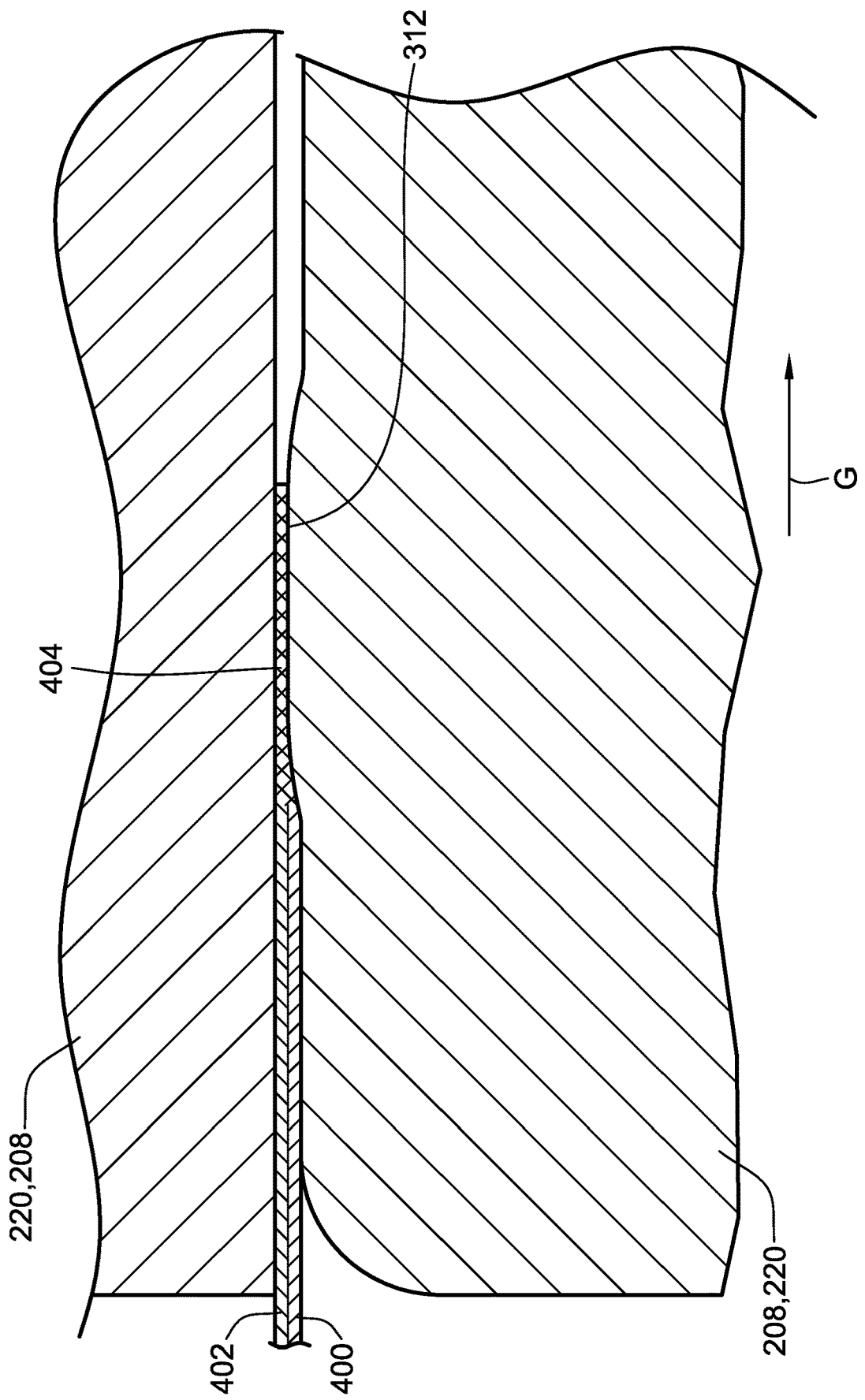
FIG. 7 is a cross-sectional view of a portion of the horn and the anvil together with the raised profile with two layers of film passing between the horn and anvil during application of ultrasonic energy.

FIG. 7 illustrates an example cross-section of two parts, which in this example are two layers of film comprising a lower film 400 and an upper film 402. As the layers 400, 402 are pulled between the horn 208 and the anvil 220, the layers 400, 402 begin to melt due to the application of ultrasonic energy into the horn 208. The layers 400, 402 are squeezed by the raised profile 312 as they move or are moved along a direction of arrow G shown in FIG. 7 into a space by force or pressure, which has a height corresponding to a thickness of only one of the layers 400, 402 (because the height of the raised profile 312 does not exceed the thickness of one of the layers 400, 402). It is assumed that the thickness of the layers 400, 402 are the same, but they do not have to be identical. The height, H3, of the raised profile can be dimensioned to accommodate the thicker of the two layers 400, 402.

An important aspect of the dimension of the height of the raised profile 312 is that it creates a dynamic stop effect without the need for an external mechanical stop apparatus. When the layers 400, 402 enter the gap between the horn 208 and the anvil 220, the amplitude of the ultrasonic energy and the nip force created at the raised profile 312 provide sufficient energy for bonding to occur along the raised profile 312. There is insufficient energy to bond in areas between the horn 208 and anvil 220 beyond the raised profile due to the weld force's being distributed across increased surface area after profile penetration has been achieved. In these areas, the unbonded layers 400, 402 prevent contact between the horn 208 and the anvil 220. As a result, this eliminates the need for an external physical mechanical stop, which otherwise would be required to maintain seal line thickness and consistency. The unbonded layers between the horn 208 and the anvil 220 become the physical stop conventionally provided by a mechanical stop, but which is eliminated by the aspects of the present disclosure herein.

In prior art systems, when the raised profile has a height much greater than the thickness of the film being presented between the horn and anvil, an external mechanical stop device is required to inform the system when to stop advancing movement of the horn. Otherwise, an excessive or inadequate amount of force or pressure can be applied to the films, and an inadequate or inferior bond formed at the sealing interface. By contrast, a depth control profile such as the profile 312 has a much shallower profile and is also narrower. This continuous profile (see FIG. 4) can weld the film 400, 402 by initiating the melt on the profile surface 312 until the profile 312 penetrates to the depth of the adjacent shoulders. Once the shoulder meets the film 400, 402, the much larger surface area bottoms out on the shoulders and the melts and penetration are halted (referred to herein as a dynamic stop effect).

The gap between the horn 208 and anvil 220 and resultant seal line thickness is determined by profile height as a percentage of the thickness of a single material ply. E.g., if material thickness=x, then the profile height is a predetermined percentage of x, typically 50% to 150%, depending upon the material being bonded and desired bonding result (e.g., hermetic seal).

The benefit of welds made by the apparatus and methods according to the present disclosure over prior art rotary systems is that the continuous weld is stronger and forms a hermetic seal. The raised profile according to the aspects of the present disclosure can be applied to multilayer, recyclable, biodegradable, compostable, monolayer, paper-based, or mono-material films. Full control of the seal line thickness is achievable according to aspects of the present disclosure, for material thicknesses in a range from 10 µm up to 150 µm.

Figure 8:
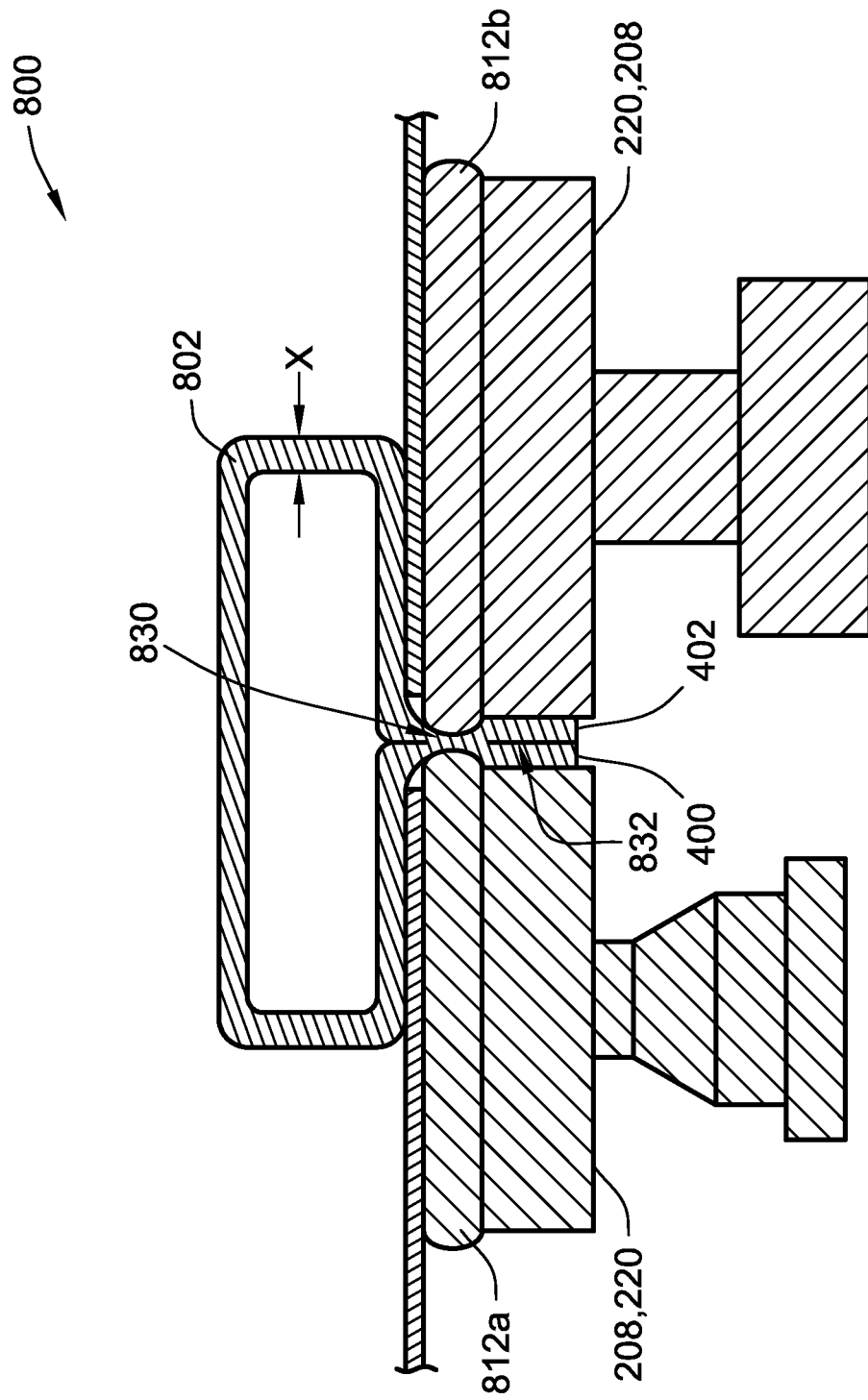
FIG. 8 is a functional diagram of a depth control configuration in which a horn and anvil each have a raised profile to achieve equal or deliberately non-equal penetration from both sides of film being bonded.

As mentioned above, a raised profile can be present on both the horn 208 and the anvil 220, with the same or unequal heights. FIG. 8 illustrates an example depth control configuration 800 in which one of the horn 208 or anvil 220 has a first raised profile 812a, and the other of the anvil 220 or horn 208 has a second raised profile 812b, both of which have been exaggerated grossly as shown in size and profile for ease of illustration and discussion. A product 802, such as a pouch or container to be filled with a liquid, and thereby requiring a hermetic seal, has a first layer 400 and a second layer 402. Each raised profile 812a, 812b must have a height of less than 100% of x (where x is the thickness of the layer 400, 402) when the profiles have the same height. When the profiles have different heights or where unequal penetration is required, one element may exceed 100% of x, but the other must be proportionately less. While both the horn 208 and the anvil 220 are shown in FIG. 8 as having a raised profile 812a, 812b, in alternate embodiments, only one of the horn 208 or the anvil 220 can have a raised profile while the other of the horn 208 and the anvil 220 lacks a raised profile.

For example, if thickness of the layer 400, 402 is 100 um (x=100) and a seal thickness at an interface 830 of 25 µm is desired, and the seal 830 needs to be offset, a profile height of 125% of x on one element 812a (horn 208 or anvil 220) and a profile of 50% x on the second element 812b (anvil or horn) will achieve an offset seal line of 25 um thickness. If equal penetration is required, then both horn 208 and anvil 220 would have a raised profile 812a, 812b having a height corresponding to 87.5% of x. The unbonded layers 400, 402 in an area 832 downstream of the seal interface 830 prevent contact between the horn 208 and the anvil 220. As a result, the need for an external physical mechanical stop is eliminated, which otherwise would be required to maintain seal line thickness and consistency. The unbonded layers 400, 402 in the area 832 between the horn 208 and the anvil 220 become the physical stop.

Figure 9:
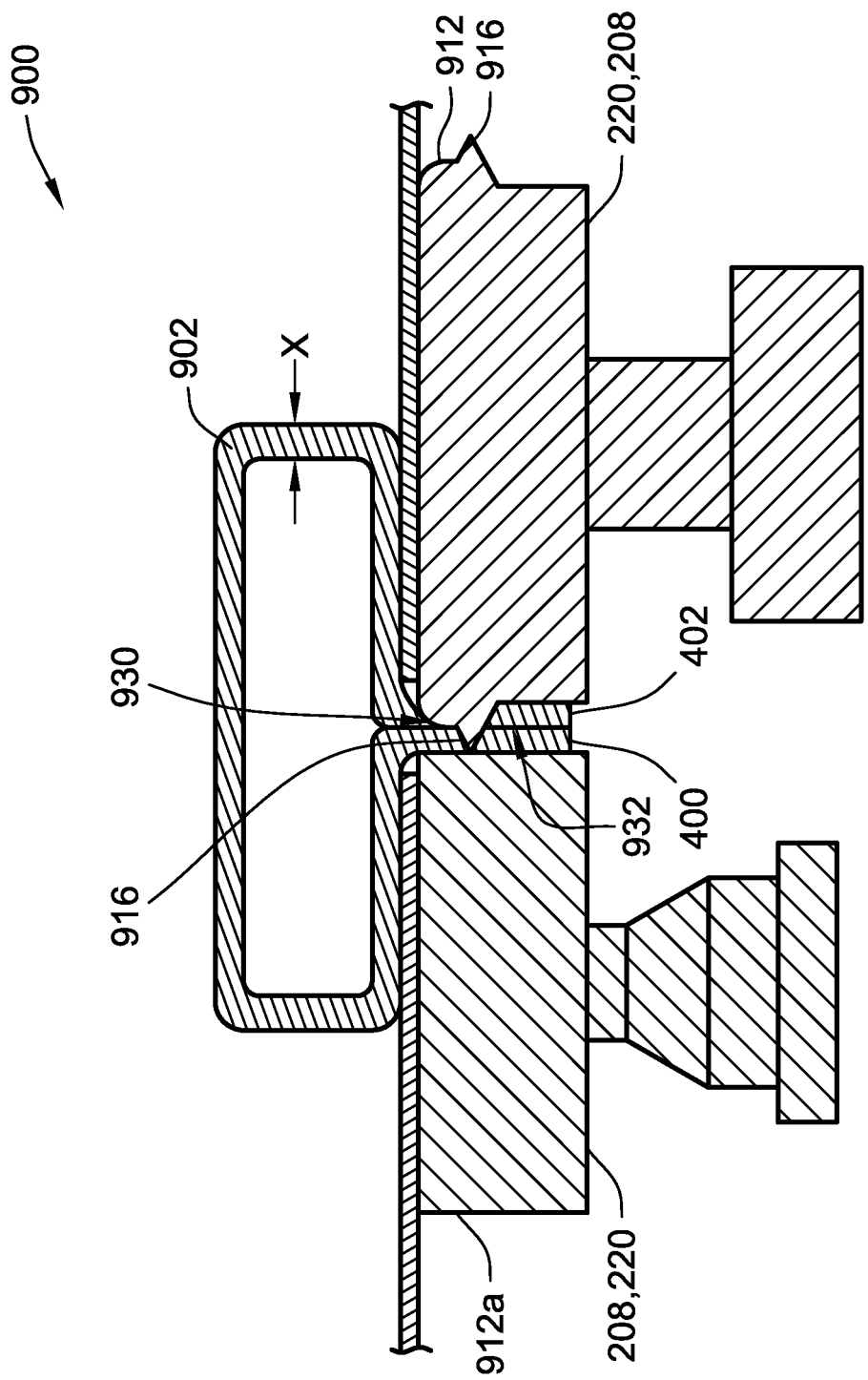
FIG. 9 is a functional diagram of a seal and score configuration in which the raised profile includes a scoring element to score the sealed layers after they have bonded.

FIG. 9 illustrates a "seal and score" configuration 900 in which the raised profile 912 on either the horn 208 or the anvil 220 includes a scoring element 916 to score or cut the sealed interface 930 of the bonded layers 400, 402 right at one of the distal (relative to the product 902) shoulders of the raised profile 912. The unbonded layers 400, 402 in the area 932 are scored or cut from the sealed interface 930, enabling a sealing and scoring operation to take place in one step. Again, like the configuration 800 shown in FIG. 8, the raised profile 912 and scoring element 916 shown in FIG. 9 has been grossly exaggerated for ease of illustration and discussion. The scoring element 916 can have a wedge shape to score other materials, such as in shrink wrap applications. The unbonded film in the area 932 maintains the bond and score depth, eliminating the possibility of the horn 208 being damaged by the anvil 220 (assuming the scoring element 916 is part of the raised profile 912 of the anvil 220).

What is claimed is:

1. An apparatus for joining a first film portion and a second film portion together along a seal line using ultrasonic energy, the apparatus comprising:
a horn configured to receive ultrasonic energy; and
an anvil positionable in close proximity to the horn that is advanced toward the anvil, wherein at least one of the horn or the anvil has a face with a width dimension and a circumference and is rotatable about a rotation axis, the face having a raised profile, a height of the raised profile relative to the face having a dimension corresponding to 50% to 150% of a thickness of the first film portion or the second film portion, the face being positioned such that the raised profile extends along the circumference, and continuous running contact is provided between the raised profile and the other of the one of the horn or the anvil when rotated about the rotation axis, to form the seal line without any external structure to control a distance between the horn and the anvil as the continuous running contact is provided.

2. The apparatus of claim 1, wherein the thickness of the first film portion and the second film portion is between 10 µm and 150 µm.

3. The apparatus of claim 1, wherein the height dimension of the raised profile corresponds to 100% of the thickness of the first film portion or the second film portion.

4. The apparatus of claim 1, wherein the height dimension of the raised profile corresponds to 87.5% of the thickness of the first film portion of the second film portion.

5. The apparatus of claim 1, the raised profile further including a scoring element configured to score or cut along the seal line as the anvil is rotated about the rotation axis.

6. The apparatus of claim 1, wherein the face has a second raised profile having a height corresponding to 50% to 150% of the thickness of the first film portion or the second film portion, the second raised profile extending along the circumference, and continuous running contact is provided between the second raised profile and the other of the one of the horn or the anvil when rotated about the rotation axis.

7. The apparatus of claim 6, wherein the height dimension of the second raised profile corresponds to 100% of the thickness of the first film portion or the second film portion.

8. The apparatus of claim 1, wherein the raised profile is part of the anvil, and further in combination with a second anvil having a second raised profile having a height dimension exceeding the height dimension of the raised profile by 0.0005 inches.

9. A product including the first film portion and the second film portion and the seal line formed by the apparatus of claim 1.

10. The apparatus of claim 1, wherein the first film portion and the second film portion are composed of a plastic.

11. The apparatus of claim 1, wherein the first film portion or the second film portion is a multilayer film, a recyclable film, a biodegradable film, a compostable film, a monolayer film, a paper-based film, or a mono-material film.

* * * * *